United States Patent [19]

Abe et al.

[11] Patent Number: 5,334,969

[45] Date of Patent: Aug. 2, 1994

[54] VEHICLE SECURITY SYSTEM WITH CONTROLLER PROXIMITY SENSOR

[75] Inventors: Koichi Abe; Mitsuhiro Murata, both of Iwaki, Japan

[73] Assignee: Alpine Electronics, Inc., Tokyo, Japan

[21] Appl. No.: 907,767

[22] Filed: Jun. 30, 1992

[30] Foreign Application Priority Data

Jul. 10, 1991 [JP] Japan .................. 3-169700

[51] Int. Cl.$^5$ .................................. B60R 25/10
[52] U.S. Cl. .................................. 340/426; 340/429; 340/551; 340/554; 340/541; 340/565; 340/506; 367/94; 342/92; 342/93; 307/9.1; 307/10.2; 180/173; 379/40
[58] Field of Search ............... 340/435, 436, 551–554, 340/429, 309.15, 539, 561, 565, 566, 541, 505, 506, 903; 367/89, 94, 93; 379/40; 342/91, 92, 93; 180/173; 343/754, 725, 757; 307/9.1, 10.1–10.2

[56] References Cited

U.S. PATENT DOCUMENTS

| | | |
|---|---|---|
| 3,732,496 | 5/1973 | Boyer . |
| 3,974,328 | 10/1976 | Thomas et al. . |
| 4,155,078 | 5/1979 | Bowling et al. . |
| 4,383,242 | 5/1983 | Sassover et al. . |
| 4,494,114 | 1/1985 | Kaish . |
| 4,567,472 | 1/1986 | Shirai et al. . |
| 4,570,247 | 2/1986 | Walker et al. . |
| 4,581,606 | 4/1986 | Mallory . |
| 4,672,375 | 6/1987 | Mochida et al. . |
| 4,679,026 | 7/1987 | Knakowski . |
| 4,691,801 | 9/1987 | Mann et al. . |
| 4,791,420 | 12/1988 | Baba .................. 340/554 |
| 4,794,268 | 12/1988 | Nakano et al. . |
| 4,866,417 | 9/1989 | DeFino et al. . |
| 4,897,630 | 1/1990 | Nykerk . |
| 4,908,604 | 3/1990 | Jacob . |
| 4,922,224 | 5/1990 | Drori et al. . |
| 4,940,964 | 7/1990 | Dao . |
| 4,987,406 | 1/1991 | Reid .................. 340/539 |
| 4,987,630 | 1/1991 | Nykerk . |
| 5,021,765 | 6/1991 | Morgan .................. 340/539 |
| 5,049,867 | 9/1991 | Stouffer . |
| 5,077,548 | 12/1991 | Dipoala .................. 340/554 |
| 5,160,914 | 11/1992 | Sato . |

FOREIGN PATENT DOCUMENTS

| | | |
|---|---|---|
| 0354102A1 | 1/1990 | European Pat. Off. . |
| 60-188579 | 3/1987 | Japan . |
| 2051442 | 1/1981 | United Kingdom . |

Primary Examiner—John K. Peng
Assistant Examiner—Nina Tong
Attorney, Agent, or Firm—Guy W. Shoup; Norman R. Klivans; Patrick T. Bever

[57] ABSTRACT

A car security system has a proximity sensor such as a radar sensor with variable sensitivity and capable of producing a detection signal upon detecting motion of a person in a monitoring area. A control circuit is provided controls the sensitivity of said proximity sensor. The system also has a monitoring/alarming control circuit for control of predetermined monitoring and alarming control on the basis of the output from the proximity sensor, and alarming devices such as a headlight flash circuit, buzzer and siren for performing a predetermined alarming operation under the control of the monitoring/alarming control circuit. The sensitivity control circuit operates in response to a predetermined operation such as an arming start operation to vary the sensitivity of the proximity sensor so as to automatically set the sensitivity to a first sensitivity level which is the highest level within a range which does not cause the sensor to produce the detection output. The monitoring/alarming control circuit determines that an abnormal state has occurred and performs a predetermined alarming control upon receipt of the detection signal from said proximity sensor after completion of setting of the sensitivity level.

17 Claims, 13 Drawing Sheets

CAR SECURITY SYSTEM 2

VEHICLE SECURITY SYSTEM WITH CONTROLLER PROXIMITY SENSOR

BACKGROUND OF THE INVENTION

1. Field of the Invention

The present invention relates to a car security system and, more particularly, to a car security system which is capable of detecting, using a proximity sensor such as an infrared sensor or a radar sensor, approach of any unauthorized person to a vehicle.

2. Description of the Related Art

A car security system is known (see FIG. 14) which is capable of detecting the approach of an unauthorized person to a vehicle by using a radar sensor. The radar sensor is disposed in, for example, a vehicle compartment and irradiates high-frequency electromagnetic waves therearound. Any motion of a person produces a low-frequency noise in the electromagnetic wave and, when the level of the noise component exceeds a predetermined level, a detection signal is generated which indicates presence of the person. The output of the radar sensor is input to the main part of a car security system which is installed on a predetermined portion of the vehicle. The main part of the car security system is set to the armed state in response to an arming operation through a transmitter handset by the driver after getting out of the vehicle, so as to monitor the output of the radar sensor to detect any abnormality. When a detection signal is issued by the radar sensor, the main part of the security system decides that an abnormal situation has occurred and activates an alarming function such as flickering of headlights or generation of an alarm sound by a buzzer or a siren so as to give a warning to the unauthorized person approaching the vehicle or to make such a person run away.

This known car security system has the following drawback due to the fact that the monitoring area is fixed. For instance, when the vehicle is parked at a position near a tree with the monitoring function set to cover the space around the vehicle to enable quick detection of an unauthorized person approaching the vehicle, the radar sensor tends to generate a detection signal upon sensing movement of the twigs of the tree. In such a case, the main part of the car security system erroneously operates to decide that an abnormal situation has occurred and wrongly produces alarm, even though no person is approaching the vehicle.

SUMMARY OF THE INVENTION

Accordingly, an object of the present invention is to provide a car security system which can operate without any erroneous detection even when the monitoring area is expanded to cover a space around a vehicle.

Another object of the present invention is to provide a car security system having a proximity sensor which can be set to first and second sensitivity levels which cover first and second monitoring areas, respectively, wherein when the proximity sensor set to the first sensitivity level has detected an output, a control operation is performed on the proximity sensor to set it to the second sensitivity level to cover the second monitoring area and, when a detection signal is received from the proximity sensor set to the second sensitivity level, the system determines that an abnormal situation has occurred and performs a predetermined alarming control.

Still another object of the invention is to provide a car security system in which, when a detection signal is received from a proximity sensor set to a first sensitivity level, the system decides that an abnormal situation has occurred and performs a first alarming control to cause an alarming means to conduct a preliminary cautionary alarming operation and sets the proximity sensor to a second sensitivity level, and wherein, when a detection signal is received from the proximity sensor set to the second sensitivity level, the system decides that an abnormal situation is definitely occurring and fully activates the alarming means to perform the full alarming operation.

To these ends, according to one aspect of the present invention, there is provided a car security system, comprising: a proximity sensor having a variable sensitivity and capable of producing a detection signal upon detecting motion of a person in a monitoring area; sensitivity control means for controlling the sensitivity of the proximity sensor; monitoring/alarming control means for control of the predetermined monitoring and alarming control on the basis of the output from the proximity sensor; alarming means for performing a predetermined alarming operation under the control of the monitoring-/alarming control means; the proximity sensor, the sensitivity control means, the monitoring/alarming control means and the alarming means being mounted on predetermined portions of a vehicle; wherein the sensitivity control means operates in response to a predetermined operation to vary the sensitivity of the proximity sensor so as to automatically set the sensitivity to a level which meets predetermined conditions; and wherein the monitoring/alarming control means determines that an abnormal state has occurred and performs a predetermined alarming control upon receipt of the detection signal from the proximity sensor after completion of setting of the sensitivity level performed by the sensitivity control means.

According to another aspect of the invention, there is provided a car security system, comprising: a proximity sensor having variable sensitivity and capable of producing a detection signal upon detecting motion of a person in a monitoring area; sensitivity control means for controlling the sensitivity of the proximity sensor; monitoring/alarming control means for control of predetermined monitoring and alarming control on the basis of the output from the proximity sensor; alarming means for performing a predetermined preliminary cautionary alarming operation or full alarming operation under the control of the monitoring/alarming control means; the proximity sensor, the sensitivity control means, the monitoring/alarming control means and the alarming means being mounted on predetermined portions of a vehicle; wherein the sensitivity control means operates, at the start of arming, so as to perform a sensitivity control operation on the proximity sensor to set the sensitivity of the radar sensor to a first sensitivity level which is the maximum sensitivity level within the range which does not cause the radar sensor to produce the detection signal, thereby setting the monitoring coverage to a first monitoring area which covers both interior and exterior of the vehicle and, when the proximity sensor has produced the detection signal during monitoring at the first sensitivity level, performs a sensitivity control operation on the proximity sensor to set the sensitivity of the proximity sensor to a second sensitivity level, thereby setting the monitoring coverage to a second monitoring area which covers only the interior of the vehicle; and wherein the monitoring/alarming control means, upon receipt of the detection signal from the proximity sensor which has been set to the first sensitivity level by the sensitivity control means, determines that an abnormal state has occurred and executes a first alarming control operation so as to enable the alarming means to perform the preliminary cautionary alarming operation and, upon receipt of the detection signal from the proximity sensor which has been set to the second sensitivity level by the sensitivity control means, determines that an abnormal state has occurred and executes a second alarming control to enable the alarming means to perform the full alarming operation.

Thus, according to the first aspect of the invention, the sensitivity control means progressively varies the sensitivity level of the proximity sensor at the beginning of the armed mode operation, so as to set the sensitivity to a level which is the highest within a range that does not cause the sensor to produce a detection signal. When a detection signal is produced by the proximity sensor in this state, the security system determines that an abnormal state has occurred and performs a predetermined alarming operation. If there is any moving object such as the moving twigs of a tree besides the vehicle, therefore, it is possible to set the monitoring area to cover an area spreading outside the vehicle and excluding the tree, thus avoiding any erroneous operation which may otherwise be caused by the motion of the twigs.

According to the second aspect of the invention, the sensitivity control means operates, at the start of arming, so as to perform a sensitivity control on the radar sensor to set the sensitivity of the radar sensor to a first sensitivity level which is the maximum sensitivity level within the range which does not cause the radar sensor to produce the detection signal, thereby setting the monitoring coverage to a first monitoring area which covers both interior and exterior of the vehicle and, when the radar sensor has produced the detection signal during monitoring at the first sensitivity level, performs a sensitive control on the radar sensor to set the sensitivity of the radar sensor to a second sensitivity level, thereby setting the monitoring coverage to a second monitoring area which covers only the interior of the vehicle. In addition, the monitoring/alarming control means, upon receipt of the detection signal from the radar sensor which has been set to the first sensitivity level by the sensitivity control means, determines that an abnormal state has occurred and executes a first alarming control operation so as to enable the alarming means to perform the preliminary cautionary alarming operation and, upon receipt of the detection signal from the radar sensor which has been set to the second sensitivity level by the sensitivity control means, determines that an abnormal state has occurred and executes a second alarming control to enable the alarming means to perform the full alarming operation.

It is therefore possible to set the monitoring area to cover an area spreading outside the vehicle and excluding the tree, thus avoiding any erroneous operation which may otherwise be caused by the motion of the twigs. In addition, the preliminary cautionary alarming operation is performed when the vehicle is approached by a suspicious person so that theft is avoided. In addition, when an unauthorized person has broken into the vehicle, the full alarming operation is put into effect to force the person to run away.

These and other objects, features and advantages of the present invention will become clear from the following description of the preferred embodiment in conjunction with the accompanying drawings.

DESCRIPTION OF THE PREFERRED EMBODIMENTS

Figure 1:
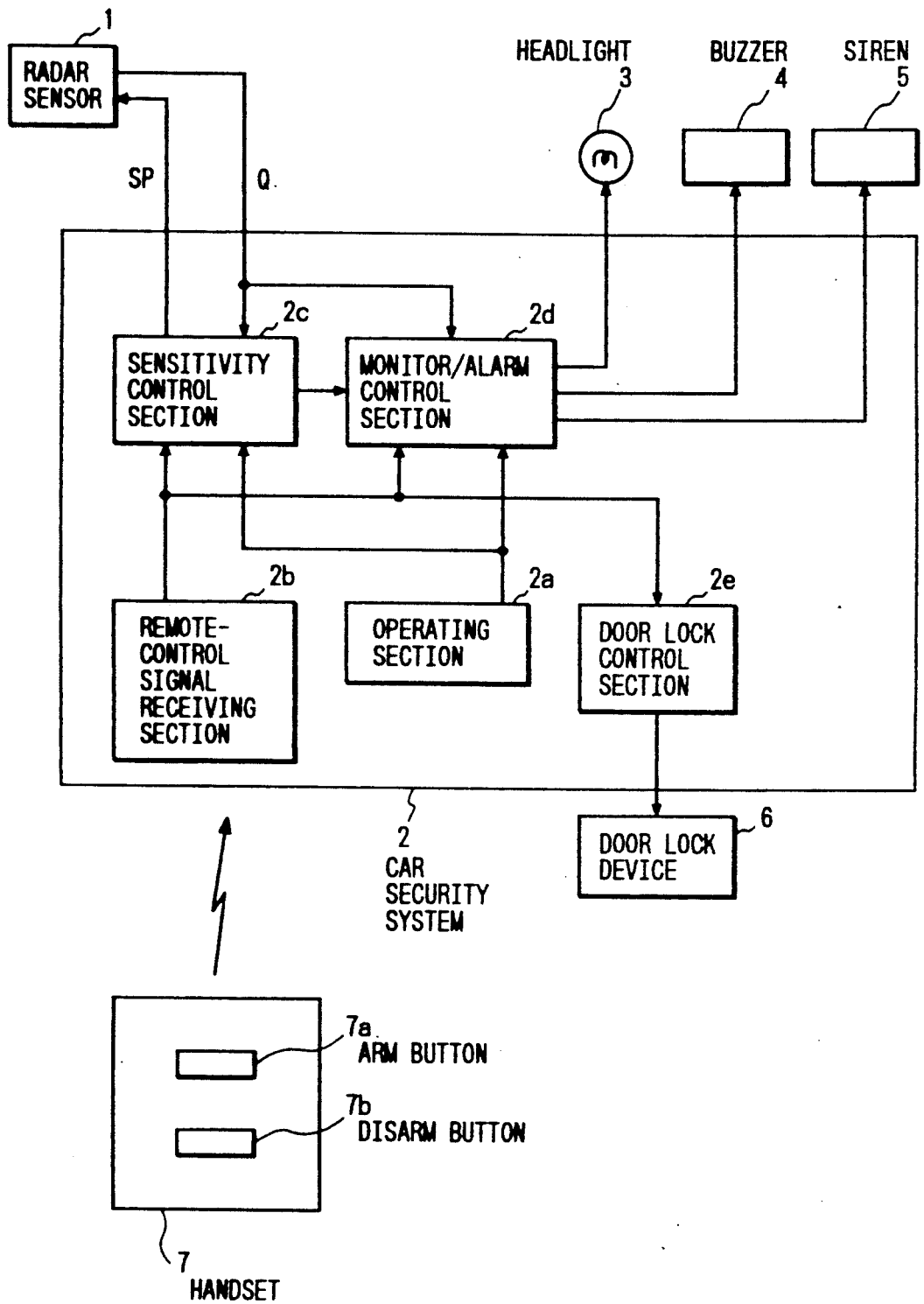
FIG. 1 is a block diagram showing the entire construction of an embodiment of the car security system in accordance with the present invention.

Referring to FIG. 1 which is a block diagram of a car security system in accordance with the present invention, the car security system includes a radar sensor 1 the sensitivity R of which can be varied over 10 stages $r_1$ to $r_{10}$. The radar sensor 1 radiates high-frequency electromagnetic waves therearound and detects any low-frequency noise component in the electromagnetic waves caused by motion of a person. When the level of the detected noise component exceeds a predetermined level, the radar sensor 1 produces a detection signal Q of L level indicating that a person is in the monitoring area which corresponds to the set level of sensitivity of the radar sensor. The car security system has a main part 2 which performs various controls operation including door lock/unlock control in the armed and disarmed modes of the system, control of sensitivity of the radar sensor 1 under the arm mode, and monitoring and alarming control in accordance with the output from the radar sensor.

The main part includes an operating system 2a through which the driver sets various modes such as a valet mode, a remote-control signal receiving section 2b for receiving various remote control signals transmitted from a later-mentioned transmitting handset, and a sensitivity control section 2c which sets the radar sensor to predetermined sensitivity levels under the armed mode. More specifically, when the car security system has been set to the armed mode, the sensitivity control section 2c operates to vary the sensitivity of the radar sensor 1 and set the same to a first sensitivity level $R_1$ which is the highest one of the levels which do not cause production of the detection signal, whereby the monitoring area covered by the radar sensor 1 is set to a first area $A_1$ which covers the interior and exterior of the vehicle. When a detection signal Q is produced by the radar sensor 1 set to the first sensitivity level, the sensitivity control section performs again the sensitivity control on the radar sensor 1 so as to set it to a second sensitivity level $R_2$ which is determined beforehand by the driver, thus setting the monitoring coverage of the radar sensor 1 to a second monitoring area $A_2$ which covers only the interior of the vehicle. When the car security system has been set to valet mode, the sensitivity control section 2c sets the second sensitivity level $R_2$ in response to a remote control operation performed by the driver.

The main part 2 of the car security system further includes a monitoring/alarming control section 2d which checks the output of the radar sensor 1 when the latter has been set to the first sensitivity level by the sensitivity control section 2c. The monitoring/alarming section, when receiving the L level detection signal Q, determines that an abnormal situation has occurred and performs a predetermined first alarm control to effect a preliminary cautionary alarming operation including flickering of headlight and generation of a beep by a buzzer 4. The monitoring/alarming control section also checks the output of the radar sensor 1 while the latter has been set to the second sensitivity level under in the armed mode for any abnormality and, upon receipt of a detection signal Q of L level, performs a second alarming control to perform full alarming operation including flickering of the headlight and activation of a siren.

The main part 2 further includes a door lock control section which performs a door lock control operation to enable a door lock device to lock the doors when the security system is set to the armed mode, whereas, when the security system is set to the disarmed mode, it performs a door unlocking control operation on the door locking device to unlock the doors.

The radar sensor 1 and the main part 2 of the car security system are respectively installed at suitable locations in the vehicle compartment.

Numeral 7 denotes a transmitting handset through which the driver gives arming or disarming instructions and registers the second sensitivity level. An arming remote control signal and disarming remote control signal are transmitted from the handset 7 when the driver presses an arm button 7a and a disarm button 7b, respectively. When the main part 2 of the car security system has not been set to valet mode, arming and disarming operations are performed in response to pressing of the arm button 7a and the disarm button 7b. When the main part 2 of the car security system has been set to the valet mode, it is possible to register the second sensitivity level by pressing the arm button 7a and the disarm button 7b. More specifically, each pressing of the arm button 7a causes a step-up of the second sensitivity level, while each pressing of the disarm button 7b causes a step-down of the second sensitivity level.

Figure 2:
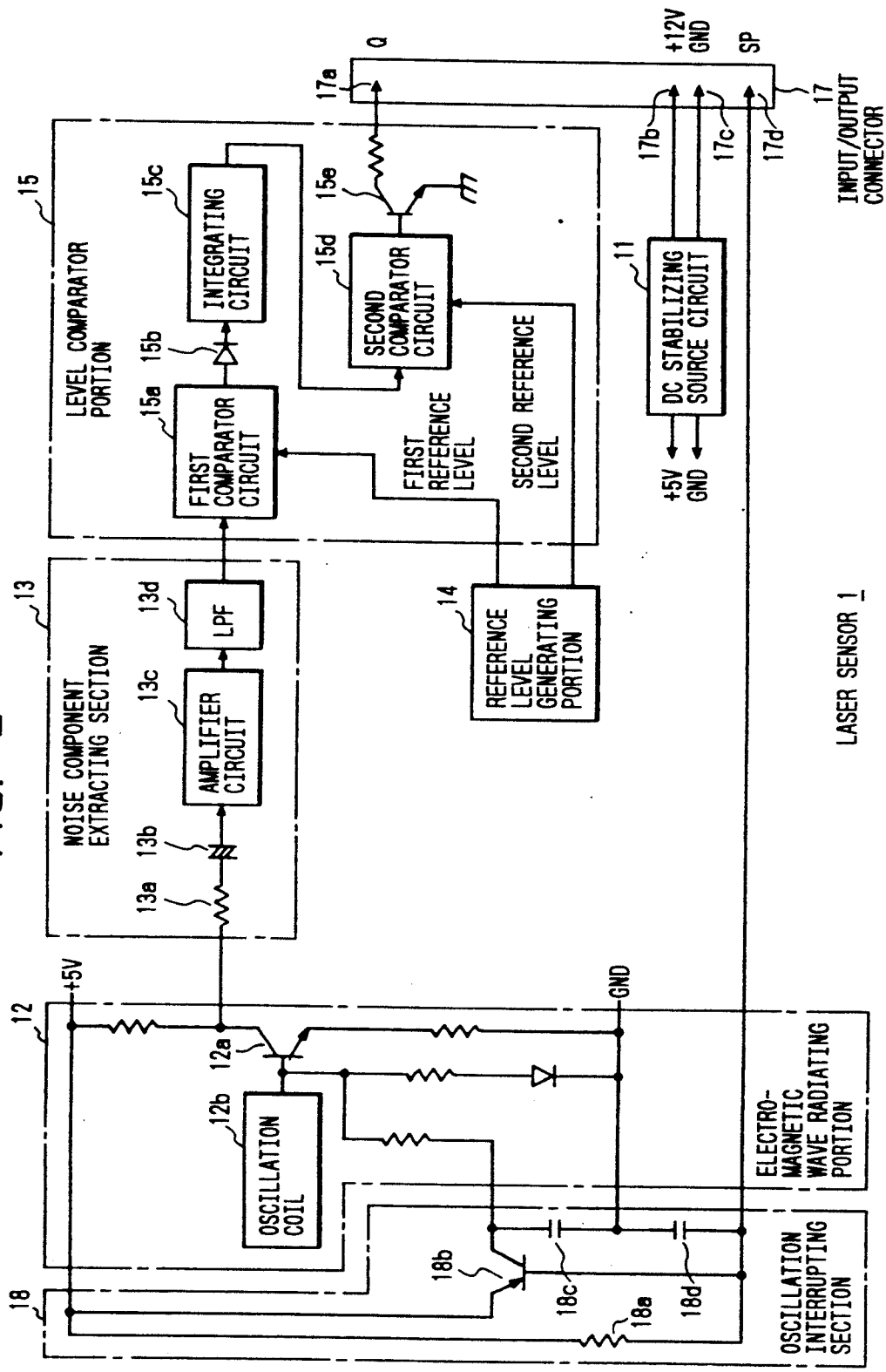
FIG. 2 is a circuit diagram showing a practical construction of a radar sensor incorporated in the system shown in FIG. 1.

Referring to FIG. 2 which is a circuit diagram showing a practical construction of the radar sensor 1, the radar has a DC stabilized power supply circuit 11 which, when supplied with a DC voltage of +12 V, produces a stabilized voltage of +5 V. Numeral 12 denotes an electromagnetic wave radiating portion which includes, for example, an oscillating coil composed of a microwave oscillating GaAs FEt 12a and a distribution constant circuit. The electromagnetic wave radiating portion 12 oscillates at a high frequency of, for example, 2.45 GHz. The electromagnetic wave is radiated to the area around the electromagnetic wave radiating portion 12 from the oscillation coil 12b which serves as an antenna. When there is a motion of a person within the field of the thus radiated electromagnetic wave, a low-frequency noise component is generated to disturb the electromagnetic wave. As a result of the disturbance, the antenna load on the electromagnetic wave radiating section 12 is varied to cause a low-frequency noise component to be superposed on the collector voltage of GaAs FET 12.

Numeral 13 denotes a noise component extracting section which has a detecting resistor 13a for detecting variation in the collector voltage of the GaAs FET 12a, a capacitor 13b for filtering out the DC component, and an amplifier circuit 13c for amplifying the variation component of the collector voltage. Numeral 13d denotes a low-pass filter which picks up the low-frequency noise component in the collector voltage of the GaAs FET 12a, thereby outputting a low-frequency noise component signal.

A level comparator portion 15 compares the picked-up low-frequency noise component signal with a predetermined reference level which is generated by a reference level generating portion 14, and outputs a detection signal when the level of the low-frequency noise component signal exceeds the reference level for a certain period.

More specifically, the level comparator portion 15 includes a first comparator circuit 15a which compares the extracted low-frequency noise component signal extracted by the noise component extracting portion with a predetermined first reference level and, delivers a signal of H level throughout a period in during which the level of the low-frequency noise component signal exceeds a first reference level. Numeral 15b denotes a check diode, 15c denotes an integrating circuit which integrates the output of the check diode 15b, and 15d denotes a second comparator circuit which, when the output of the integrating circuit has exceeds a predetermined second reference level, outputs an H level signal to turn on an open collector transistor 15e to cause the latter to deliver a detection signal Q of L level.

Figure 3:
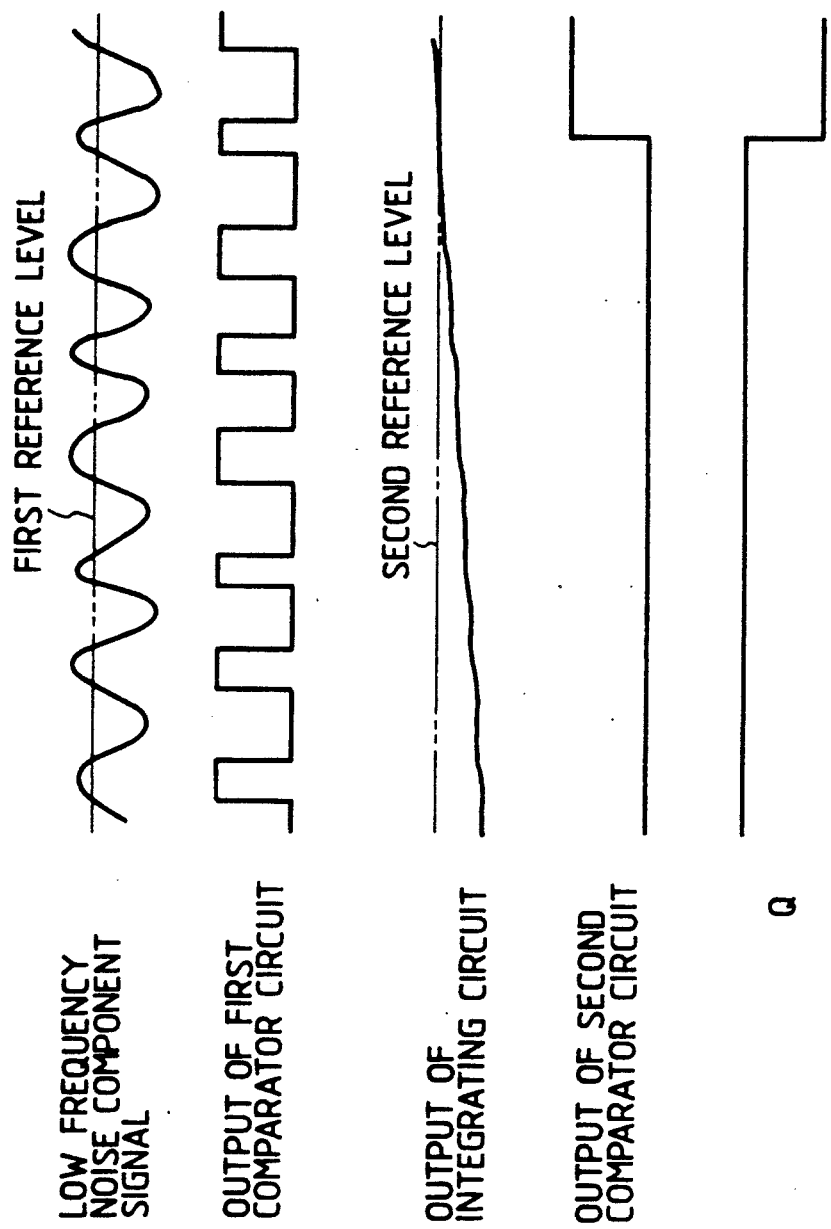
FIG. 3 is a time chart illustrating the operation of a level comparator section of the radar sensor shown in FIG. 2.

FIG. 3 is a chart showing waveforms of various signals appearing in the level comparator portion 15. It will be seen that the detection signal Q is generated only when the low-frequency noise component signals exceeds the first reference level for a certain period. In other words, the detection signal Q is not produced when the level of the low-frequency noise component signal lasts only for a short period.

Figure 4:
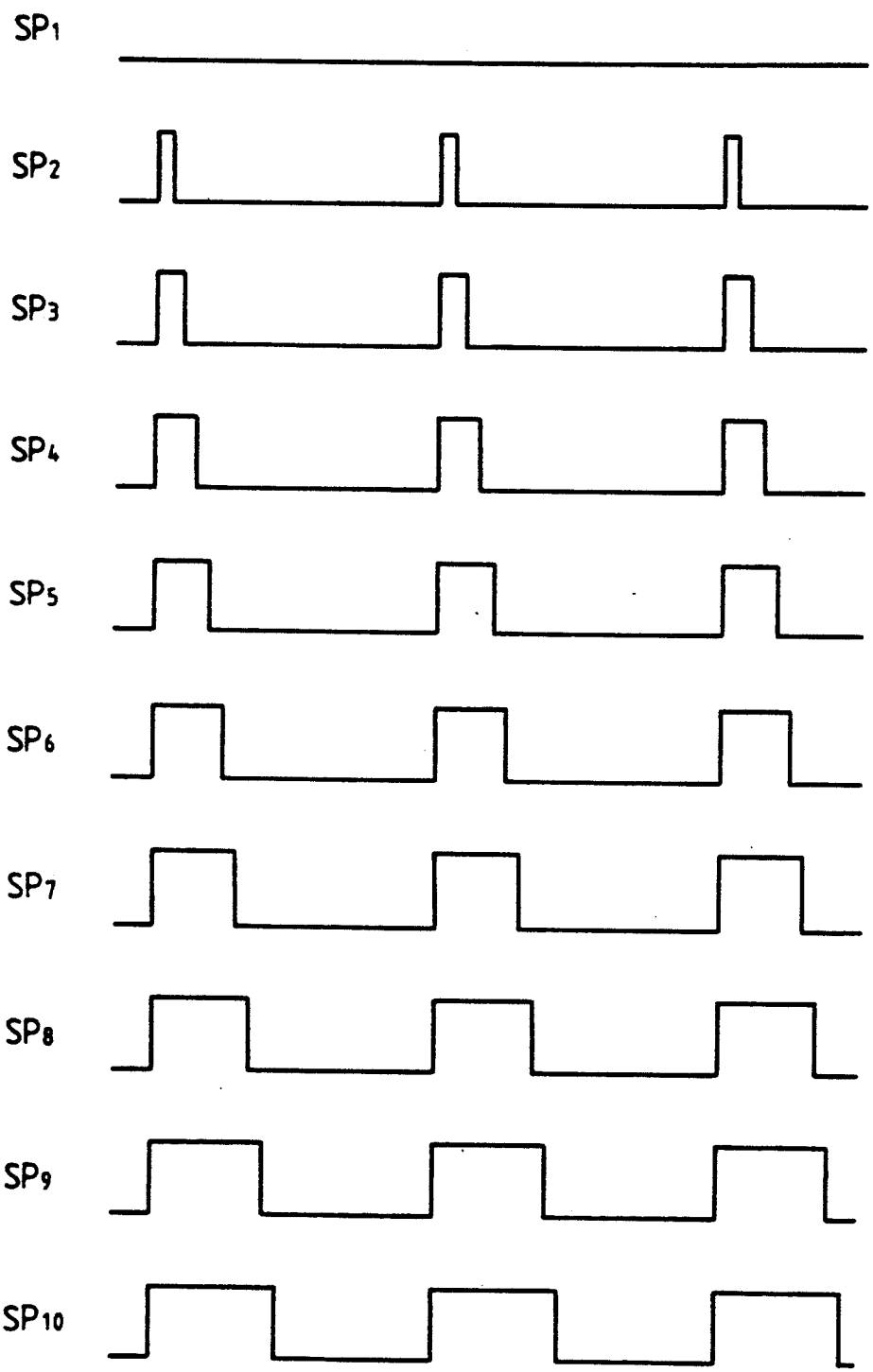
FIG. 4 is a time chart illustrating a practical example of a sensitivity control pulse signal.

Numeral 17 of FIG. 2 denotes an input/output connector which is mounted on a case of the radar sensor 1 and which is connected to the main part 2 of the car security system through a cable (not shown). The input/output connector 17 has a detection signal output terminal 17a, a positive power input terminal 17b, a grounded terminal 17c and a sensitivity control pulse signal input terminal 17d. A sensitivity control pulse signal, the duty ratio of which varies over 10 stages from small to large ($SP_1$ to $SP_{10}$, see FIG. 4), is provided externally through the sensitivity control pulse signal input terminal 17d of the input/output connector 17. An oscillation interrupting section 18 interrupts the oscillating operation in accordance with the above-mentioned sensitivity control pulse signal SP. The sensitivity control pulse signal $SP_1$ is a continuous L level signal with duty ratio of 0%.

Numeral 18a of FIG. 2 designates a pull-up resistor which receives the sensitivity control pulse signal SP, 18b denotes a transistor the base of which receives the sensitivity control pulse signal SP, and 18c and 18d denote capacitors. The transistor 18b is turned on when the sensitivity control pulse signal SP is of L level, so that the GaAs FET 12a is turned on to cause the electromagnetic wave radiating section 12 to oscillate. Conversely, when the sensitivity control pulse signal is of H level, the transistor 18b is turned off so that GaAs FET 12a also is turned off to terminate oscillation of the electromagnetic wave radiating section 12. Thus, the electromagnetic wave radiating portion 12 interrupts the oscillation in accordance with the duty ratio of the sensitivity control pulse signal.

The frequency of the sensitivity control pulse signal SP is set to a level much higher than that of the low-frequency noise component of the electromagnetic wave which is generated by ordinary movement of a human body (e.g. up to 125 Hz). The varying component of the collector voltage of the GaAs FET generated as a result of interruption of the oscillation is filtered out by the low-pass filter 13d of the noise component extracting section 13, so that it is not delivered to the level comparator portion 15.

Figure 12:
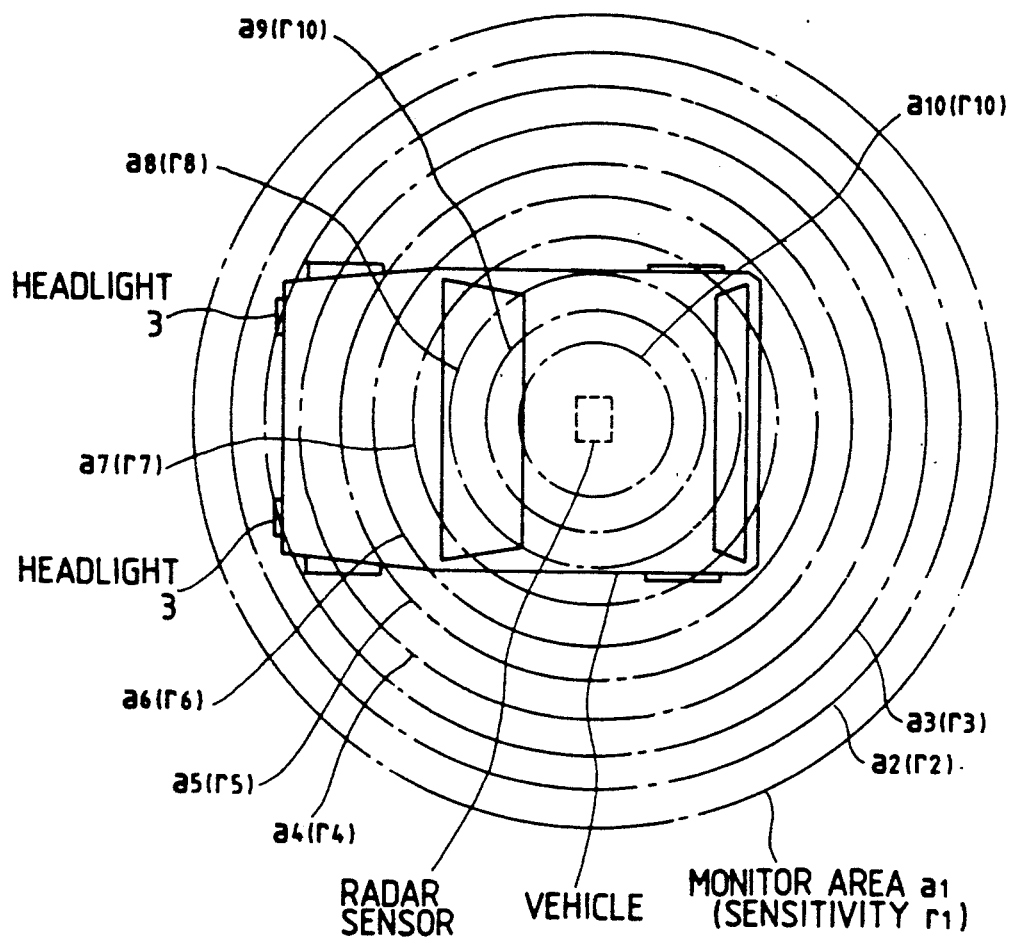
FIG. 12 is an illustration of the relationship between the sensitivity level of a radar sensor and monitoring area covered by the radar sensor.

The greater the duty ratio of the sensitivity control pulse signal SP, the smaller the period of oscillation of the electromagnetic wave radiating portion and, hence, the lower the level of output from the noise component extracting portion 130 Consequently, the output from the noise component extracting portion hardly exceeds the first reference level in the comparison performed by the level comparator portion 15, with the result that the rate of increase of the output level from the integrating circuit 15c is reduced to make it impossible for the output of the integrating circuit 15c to exceed the second reference level, thus making it difficult to obtain the detection signal Q from the open collector transistor 15e. In other words, the sensitivity level R of the radar sensor 1 is varied over ten stages including the maximum sensitivity level $r_1$ and the minimum sensitivity level $r_{10}$ in inverse proportion to the duty ratio of the sensitivity control pulse signal SP. Consequently, the monitoring area is also varied over ten stages including the maximum monitoring area $a_1$ and the minimum monitoring area $a_{10}$, as illustrated in FIG. 12. The maximum monitoring area $a_1$ widely spreads outside the vehicle, while the minimum monitoring area $a_{10}$ covers only a limited portion of the space inside the vehicle compartment.

Figure 5:
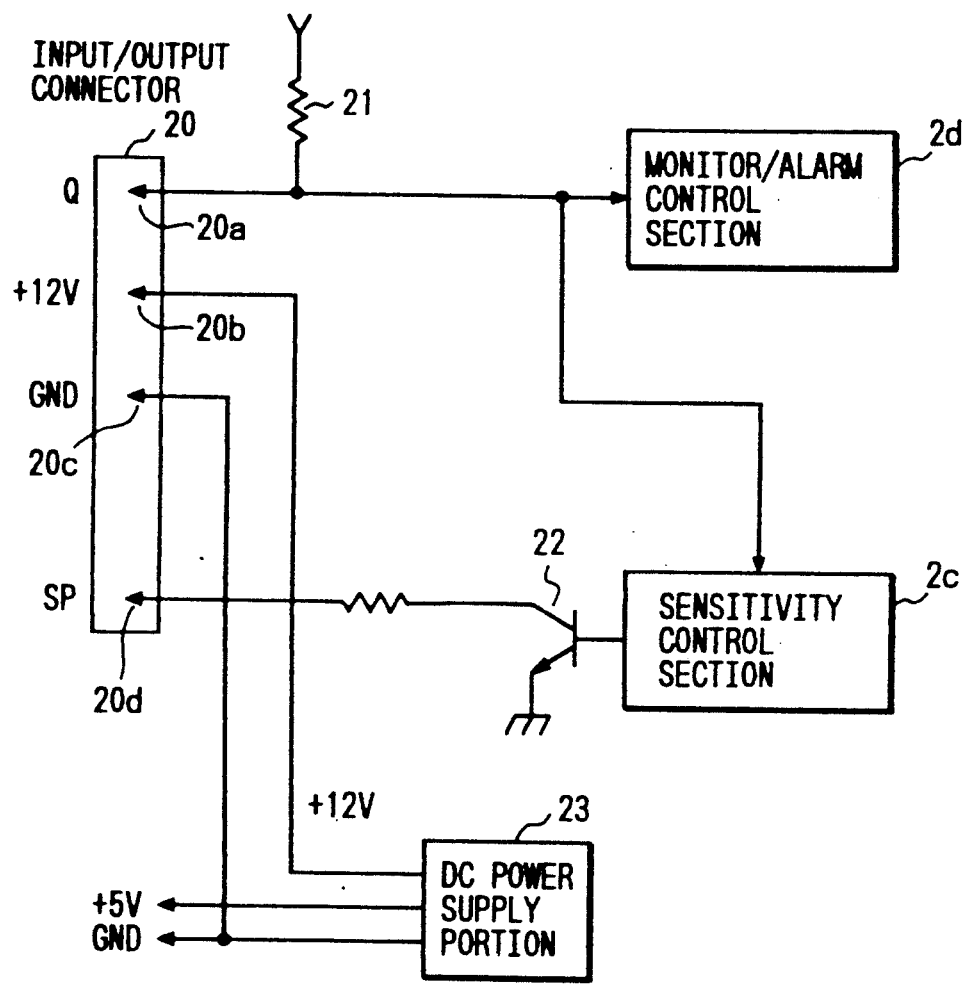
FIG. 5 is a circuit diagram illustrating the input/output stages of the main part of the car security shown in FIG. 1.
Figure 6:
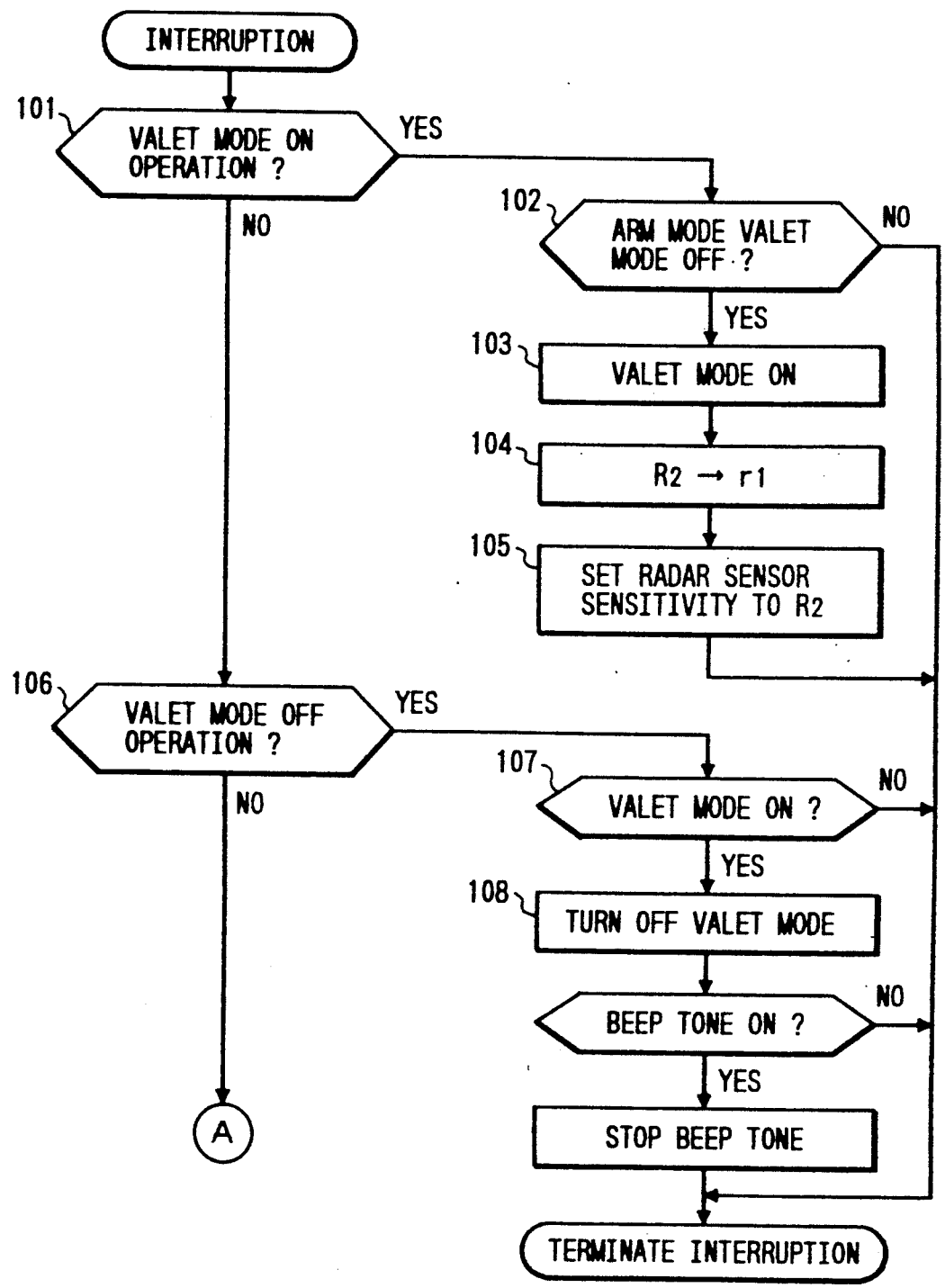
FIG. 6 is a first flow chart illustrating the operation of the car security system shown in FIG. 1.
Figure 7:
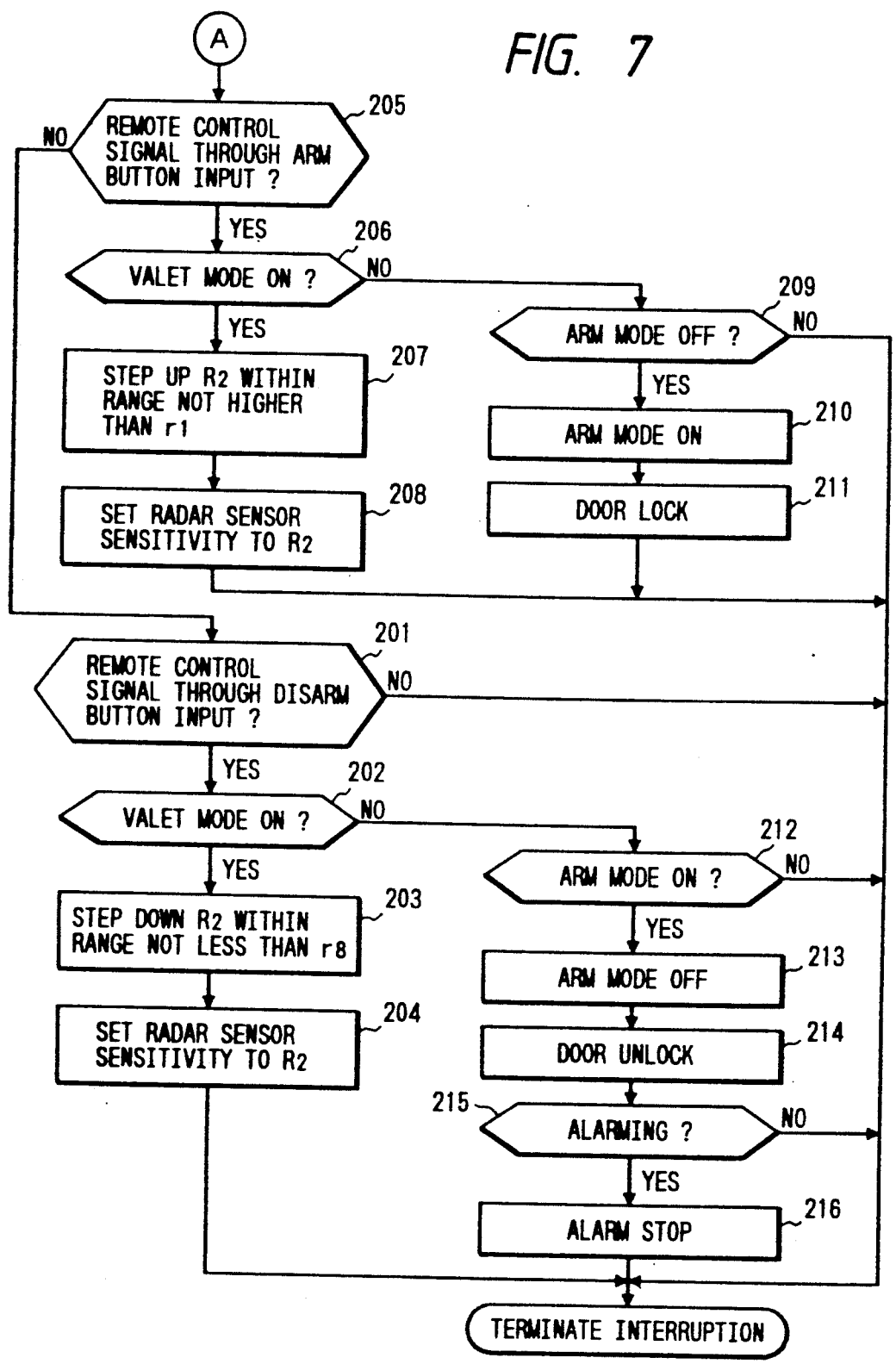
FIG. 7 is a second flow chart illustrating the operation of the car security system shown in FIG. 1.

In FIG. 5, the input/output connector 17 of the radar sensor 1 is connected through a cable to an input/output connector 20 of the car security system. Numeral 20a denotes a detection signal input terminal connected to the detection output terminal 17a, 20b denotes a positive power terminal connected to the positive power terminal 17b, 20c denotes a grounded terminal connected to the grounded terminal 17c, and 20d denotes a sensitivity control pulse signal terminal which is connected to the sensitivity control pulse signal input terminal 17d. Numeral 21 designates a pull-up resistor which forms a detection signal input circuit, while 22 denotes an open collector transistor which serves as an an output circuit for delivering the sensitivity control pulse signal. The sensitivity control section 2c delivers the sensitivity control pulse signal SP to the radar sensor 1 through the open collector transistor 22. The sensitivity control section 2c and the monitoring/alarming control section 2d receive the detection signal Q through the pull-up resistor 21. More specifically, when the open collector transistor 15e of the radar sensor 1 is turned on, the detection signal Q of L level is delivered to the sensitivity control section 2c and the monitoring/alarming control section 2d. Numeral 23 designates a DC power supply portion including a DC-DC converter which delivers voltages of +12 V and +5 V when supplied with +12 V from a battery.

Figure 13:
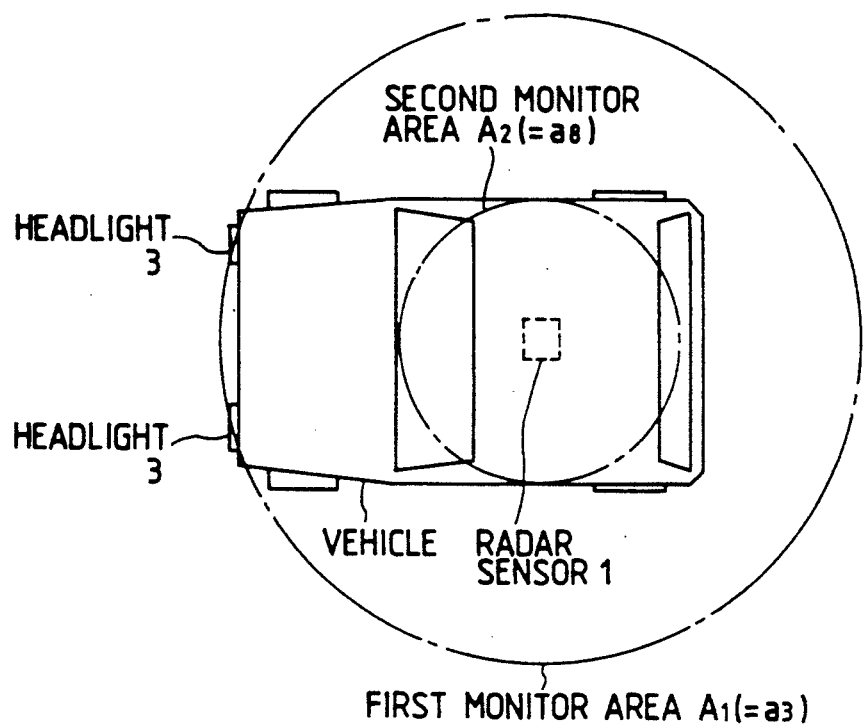
FIG. 13 is an illustration of the monitoring area monitored by the radar sensor in an armed state.
Figure 14:
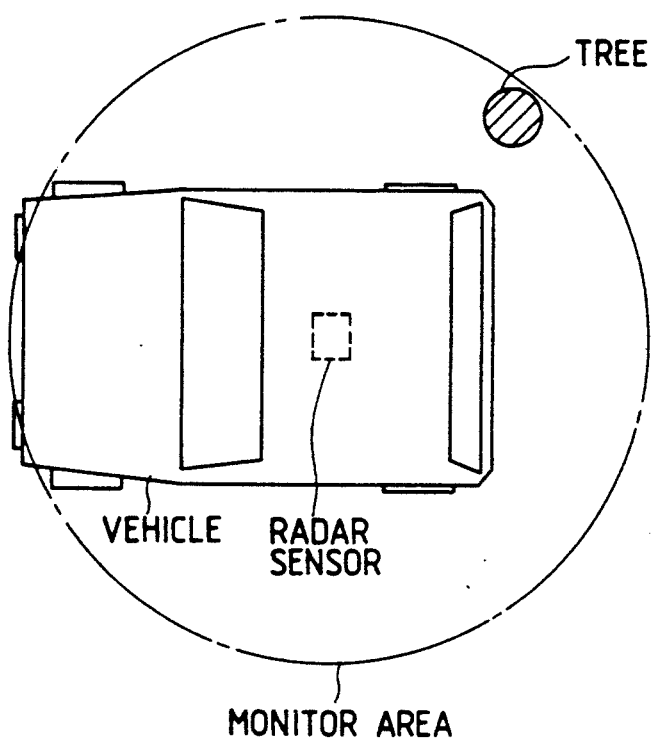
FIG. 14 is an illustration of the monitoring area monitored by a radar sensor in a known car security system.

FIGS. 6 to 11 are flow charts illustrating the operation of the main part 2 of the car security system. FIG. 12 is an illustration of the relationship between the sensitivity level of the radar sensor 1 and the monitoring area while FIG. 13 is an illustration of the monitoring area covered by the radar sensor 1. The operation command entered through the operating section 2a and the remote control signals received by the remote-control signal receiving portion 2b are accepted and executed as interrupting routines by the main part 2 of the car security system.

REGISTRATION OF SECOND SENSITIVITY LEVEL R2 (FIG. 12)

The driver, after purchasing the vehicle, can register a second sensitivity level corresponding to the type or model of the vehicle, such that the second monitoring area developed by the radar sensor 1 covers only the interior of the vehicle. The procedure for setting and registering the second sensitivity level is as follows. The driver presses a predetermined key on the operating section 2a of the main part 2 of the car security system so as to set the main part 2 to the valet mode (Steps 101 to 103 in FIG. 6). Then, the second sensitivity data $R_2$ stored in the internal memory of the sensitivity control section 2c is set to r1 (maximum sensitivity) (Step 104), and sensitivity control pulse signal $SP_1$ is delivered to the radar sensor 1 in accordance with the second sensitivity data $R_2$. When the sensitivity control pulse signal $SP_1$ is received by the radar sensor 1, the sensitivity R of the radar sensor 1 is set to r1, whereby the monitoring area A is set to the maximum one $a_1$.

The driver then gets out of the vehicle and stands by the door and then moves slightly. Since the monitoring area R = $a_1$ widely spreads outside the vehicle, the radar sensor 1 produces a detection signal Q of the L level. That is, when the driver moves, the noise component of the electromagnetic wave radiated from the electromagnetic wave radiating section 12 is extracted by the noise component extracting section 13. In this case, since the duty ratio of the sensitivity control pulse signal is small (0%) in this case, the noise component signal exhibits a level which is so high that the proportion of the period in which the first reference signal is exceeded is increased. Consequently, the output level of the integrating circuit 15c rises quickly to exceed the second reference level, with the result that the open collector transistor 15e is turned on, whereby the detection signal Q of L level is produced.

Figure 8:
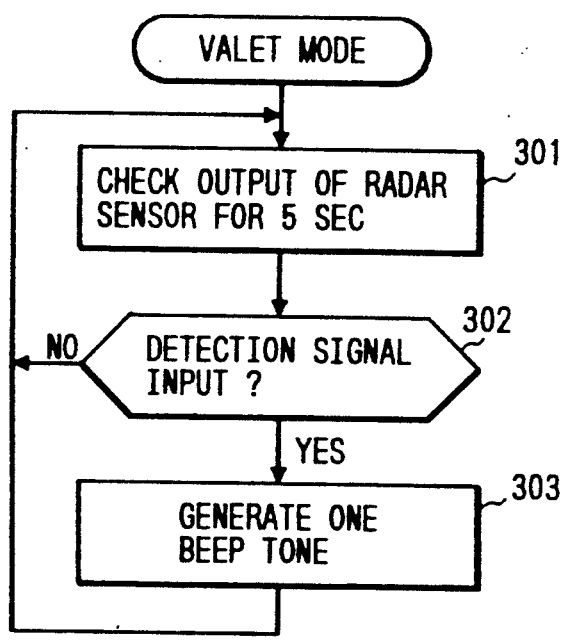
FIG. 8 is a third flow chart illustrating the operation of the car security system shown in FIG. 1.

When the car security system is set to the valet mode, the monitoring/alarming control section 2d of the main part 2 of the car security system checks the radar sensor for a period of 5 seconds (Step 301 in FIG. 8). When the detection signal Q is received from the radar sensor 1 in this state, the monitoring/alarming control section 2d controls a buzzer 4 to cause the latter to generate a beep (Steps 302, 303). The driver then pushes the disarm button 7a on the handset 7 once, so that a remote control signal is transmitted and is received by a remote control signal receiving section 2b of the main part 2a of the car security system. In this case, since the system has been set to the valet mode, the sensitivity control section 2c operates to step down the second sensitivity data $R_2$ to the sensitivity level $r_2$ which is one step below the initial (maximum) sensitivity level. Then, the sensitivity control pulse signal $SP_2$ is output on the basis of this sensitivity data $R_2$, thereby setting the sensitivity R of the radar sensor 1 to $r_2$. (Steps 201 to 204, FIG. 7). The monitoring area A is reduced by one step to area $a_2$.

It is assumed here that the driver has moved slightly at the position near the door. In this state, since the monitoring area $a_2$ still spreads to the exterior of the vehicle, the radar sensor 1 produces a detection signal Q as in the preceding case, so that the monitoring/alarming control section 2d activates the buzzer 4 to generate a beep (Steps 301, 303, FIG. 8). The described operation is repeated a plurality of times, e.g., 7 times to set the sensitivity level $r_8$, until the signal output from the radar sensor 1 is terminated so that the buzzer does not produce a beep any more. The operation through the handset 7 is then ceased and the driver then conducts the valet-off operation through the operating section 2a of the main part 2 of the car security system. Consequently, the valet mode is turned off (Steps 106 to 108, FIG. 6), so that the sensitivity level $r_8$ is registered as the sensitivity data $R_2$ in the sensitivity control section 2c. This sensitivity level $R_2 (=r_8)$ provides a monitoring area (second monitoring area) which covers only the interior of the vehicle (see FIG. 13) and is used as the fixed second sensitivity level $R_2$ each time the car security system is operated.

The detection signal Q is not produced when the sensitivity is set to the level $r_8$ because the sensitivity control pulse signal S has a comparatively large duty ratio. Consequently, the level of the noise component extracted by the noise extracting section 13 is so small that the frequency at which the first reference level is exceeded by the noise component level is reduced, with the result that the output level of the integrator circuit 15c can hardly exceed the second reference level, thus keeping the open collector transistor 15e in an off state. It is possible to raise the sensitivity of the radar sensor 1 by pressing the arm button 7a of the handset 7 when the system has been set to the valet mode (Steps 205 to 208, FIG. 7).

CAR SECURITY OPERATION (FIG. 13)

Figure 9:
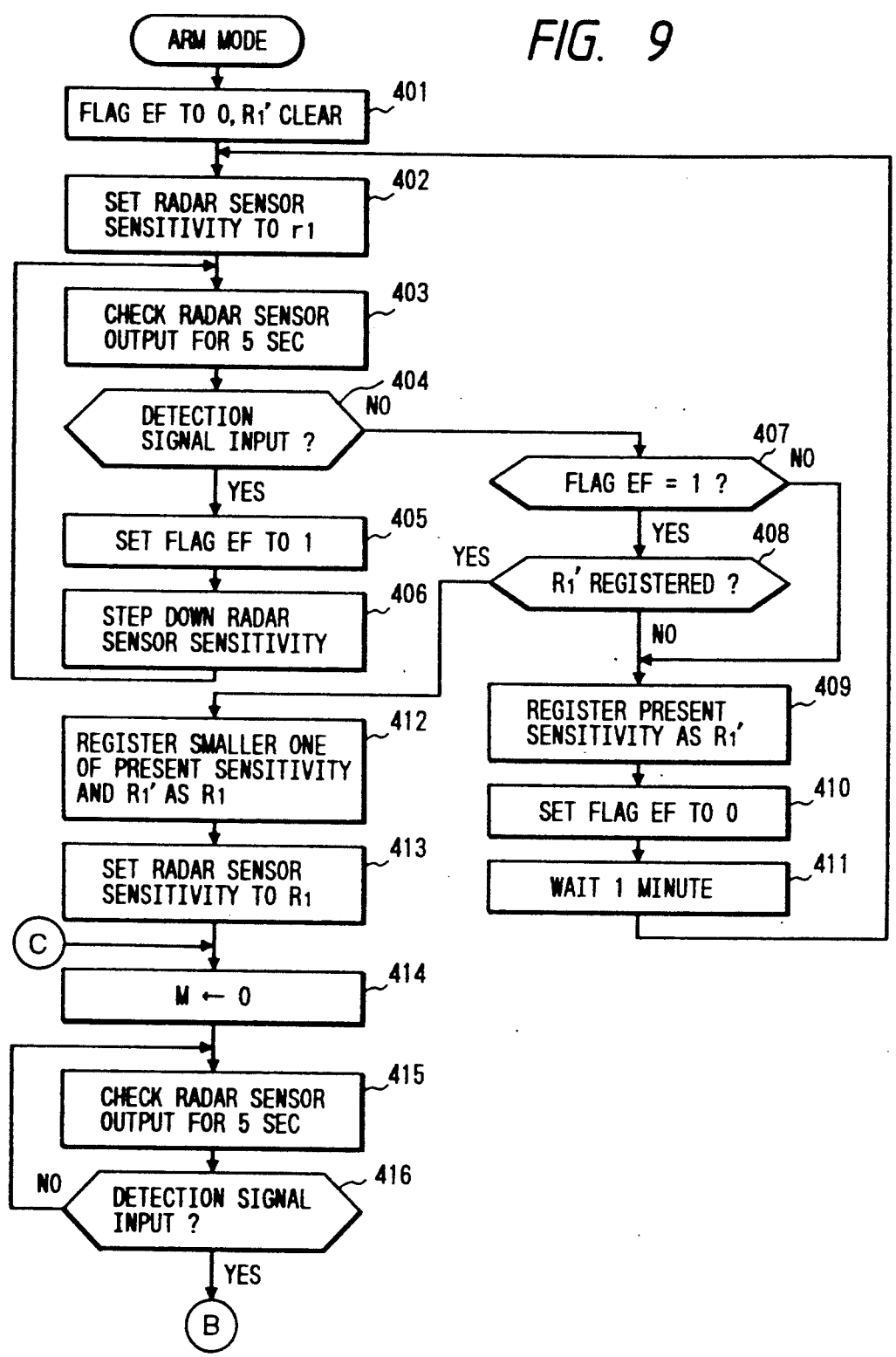
FIG. 9 is a fourth flow chart illustrating the operation of the car security system shown in FIG. 1.

When the car security system operates with the second sensitivity $R_2$ set to a level which covers only the interior of the vehicle, the driver gets out of the vehicle and closes the door and, after walking away from the vehicle to a suitable location, presses the arm button 7a on the handset 7. Consequently, a remote control signal is transmitted from the handset 7 and is received by the remote control signal receiving section 2b of the main part 2 of the car security system. Consequently, the car security system is set to the arm mode (Steps 205, 206, 209, 210, FIG. 7), and the door lock control section 2e controls the door locking device 6 so as to lock the doors (Step 211). Subsequently, the flow of FIG. 9 is commenced in which flags EF and $R_1'$ are cleared in the sensitivity control section 2c (Step 401) and, thereafter, the sensitivity control section 2c delivers the sensitivity control pulse signal $SP_1$ to the radar sensor 1 so as to set the latter to the maximum sensitivity level $r_1$, thus developing the maximum monitoring area $a_1$. Then, the main part 2 of the security system checks the output of the radar sensor for a period of 5 seconds.

If the position where the driver stands is within the monitoring area a1 or if the twigs of a tree near the vehicle move, the radar sensor 1 may produce a detection signal Q of L level during the checking period of 5 seconds. Such a detection signal Q turns on the flag EF indicative of a reception of detection signal by the sensitivity control section 2c (Steps 404, 405). Then, a sensitivity control pulse signal $SP_2$ is delivered to the radar sensor 1 so as to step down the sensitivity by one step to r2, thus stepping down the monitoring area to $a_2$ which is one step below the area $a_1$. (Step 406) The output of the radar sensor is checked again for 5 seconds (Step 403). If the detection signal Q is received again after stepping down the sensitivity to $r_2$, the sensitivity control section 2c delivers a sensitivity control pulse signal SP3 to the radar sensor 1 to further step down the sensitivity to $r_3$, thus stepping the monitoring area down to $a_3$. (Step 404 to 406) The output of the radar sensor is checked again for 5 seconds. (Step 403) If the detection signal Q from the radar sensor 1 is no longer received, the current sensitivity $r_3$ is registered temporarily as $R_1'$ since the flag EF has been raised. (Steps 404, 407 to 409)

The sensitivity control section 2c then clears the flag EF and suspends its operation for a period of 1 minute until the driver moves sufficiently away from the vehicle. (Step 410, 411) . Thereafter, the sensitivity control section 2c again delivers the sensitivity control pulse signal $SP_1$ to the radar sensor 1 so as to set the sensitivity to the maximum level $r_1$, thereby setting the monitoring area to the maximum $a_1$ (Step 402). A 5-second checking of the radar sensor output is then conducted. (Step 403) If the detection signal Q of L level is produced by the radar sensor 1 due to, for example, movement of twigs of a tree, the sensitivity control section 2c raises the flag EF (Steps 404, 405) and delivers a sensitivity control pulse signal $SP_2$ to the radar sensor 1, so as to step down the sensitivity level to $r_2$, thereby causing a step down of the monitoring area to $a_2$ (Step 406). A 5-second checking of the radar sensor output is conducted again (Step 403). If no detection signal Q is received after the setting of the sensitivity level to $r_2$, since the flag EF has been raised, the smaller one of the instant sensitivity level $r_2$ and the preceding sensitivity level $R_1'$ is registered as the first sensitivity $R_1$. (Steps 404, 407, 408, 412) In this case, $R_1$ is set to $r_3$, since $R_1'=r_3$ is smaller. It is to be noted, however, that the sensitivity level $R_1$ is equal to or higher than $R_2$.

The sensitivity control section 2c produces a sensitivity control pulse signal $SP_3$ on the basis of the first sensitivity $R_1$ and delivers the same to the radar sensor 1 to set the sensitivity level R to $r_3$, thus setting the first monitoring area $A_1$ to $a_3$. (Step 413, see FIG. 13) By setting the sensitivity R of the radar sensor 1 to the first sensitivity $R_1$, it is possible to create a monitoring condition which is optimum for the present parking environment. Namely, it is possible to perform the security operation over a monitoring area spread to the exterior of the vehicle excluding the tree which is besides the vehicle and leaves or twigs of which are moving. Since the operation for searching the optimum sensitivity is conducted twice in a predetermined time, it is possible to avoid any erroneous setting of the first monitoring area which may be caused due to closeness of the driver's position to the vehicle even when the twigs are not moving. The duplication of operation for setting the optimum sensitivity is not essential and may be conducted only once, provided that the driver conducts the arming operation from a position which is sufficiently spaced away from the vehicle.

The operation for setting the first sensitivity $R_1$ is conducted each time the armed mode is turned on, i.e., each time the operation in the armed mode is started.

After execution of Step 413, the flag M is cleared in the main part 2 of the car security system (Step 414) and, thereafter, the sensitivity control section 2c conducts a 5-second check of the output of the radar sensor whose monitoring area has been spread to $A_1 = a_3$ to cover also the exterior of the vehicle (Step 415). Presence of any person in the monitoring area $A_1$ causes the radar sensor 1 to produce the detection signal Q of L level, so that the sensitivity control section 2c determines that the detection signal has been received (YES in Step 416) and produces a sensitivity control pulse signal SP8 on the basis of the second sensitivity data $R_2$ ($=r_8$) to change the monitoring area to $A_2$ ($=a_8$) to cover only the interior of the vehicle (Step 501 in FIG. 10, see also FIG. 13). Then, the sensitivity control section 2c and the monitoring/alarming control section 2d perform a 5-second check of the output from the radar sensor. (Step 502) If no detection signal Q is produced from the monitoring area $A_2$, the sensitivity control section 2c operates to reset the sensitivity R of the radar sensor 1 to R1 (Steps 503, 504). Then, a 5-second check of the radar sensor output is conducted (Step 505).

If no detection signal Q is found during this check, the system understands that an ordinary person has happened to step into the monitoring area $A_1$, (NO in Step 506) and returns the process to Step 4 14 of FIG. 9. Production of the detection signal Q by the radar sensor 1 after setting the monitoring area to $A_1$ in Step 504 suggests that the person is a suspicious person. In such a case, the monitoring/alarming control section 2d determines that an extraordinary situation has occurred outside the vehicle, and executes the first alarming operation to provide a preliminary cautionary alarm by flickering of the headlights 3 and generation of a four beep tone by the buzzer 4 (Step 507). Such a cautionary alarm informs the person that the vehicle is equipped with the security function so as to discourage the person, to prevent an incident such as theft. After execution of Step 507, the sensitivity control section 2c operates to set the sensitivity of the radar sensor to $R_2$, thus reducing the monitoring area to $A_2$ ($=a_8$) which covers only the interior of the vehicle (Step 508). Then, the sensitivity control section 2c and the monitoring/alarming control section 2d check the output of the radar sensor 1 for a period of 30 seconds (Step 509).

If no detection signal Q is obtained from the radar sensor 1 in this state, the system determines that there is no abnormality in the vehicle. The sensitivity control section 2c then resets the sensitivity of the radar sensor 1 to $R_1$ (Steps 510, 511), followed by a 5-second check of the radar sensor output (Step 512). If no detection signal Q is obtained during the checking period of 5 seconds (NO in Step 513), the system understands that there is no abnormality and returns the process to Step 414 of FIG. 9. If the detection signal Q is received after setting of the sensitivity to $R_1$ in Step 511, M is incremented by 1 in the main part 2 of the car security system and a determination is conducted as to whether M is 3 or not (Steps 514, 515). In this case, since the answer is NO, the process returns to Step 507 so that the monitoring/alarming control section 2d conducts the first alarming control to flicker the headlight 3 and to activate the buzzer 4. After the sensitivity control section 2c has changed the sensitivity of the radar sensor 1 to R2 (Step 508), a 30-second check of the radar sensor output is executed (Step 509).

If the detection signal Q is also not found in this state, the sensitivity is set to R1 again so as to conduct a 5-second check of the radar sensor 1 (Steps 510 to 512). If there still is no detection signal Q, the process returns to Step 414 of FIG. 9. However, if the detection signal Q is found, M is incremented to 2 (Step 514). Since M is still unequal to 3, the process returns to Step 507 to effect cautionary alarming operation by flickering of the headlights 3 and activation of the buzzer 4. The sensitivity is then set to $R_2$, followed by a 30-second check of the radar sensor output (Steps 508, 509). If there is a person breaking into the vehicle, the radar sensor 1 produces the detection signal Q under the limited monitoring area $A_2$. As a result, the monitoring/alarming control section 2d determines that an abnormal situation has occurred in the vehicle (Step 510), and conducts the second alarming control to continue full alarming operation for one minute by flickering the headlights 3 and activating the siren 5. Consequently, the person entering the vehicle is surprised and runs away, while the alarm informs the driver and other persons around the vehicle of the presence of the person such as a thief. After execution of Step 516, the process returns to Step 414 so that the same process as that described above before is executed. If the person still stays in or around he vehicle, the radar sensor 1 produces the detection signal Q so that the answers YES is given in Step 416, as well as in Steps 503, 506 and 510 in FIG. 10, thereby activating alarming functions such as flickering of the headlights 3, generation of a beep from the buzzer and activation of the siren If the persons has run away as a result of the preliminary cautionary alarming control or full alarming operation, the radar sensor 1 does produce the detection output Q, so that the cautionary or full alarming operation ceases. Thereafter, Steps 414 onwards are executed as described before.

Figure 10:
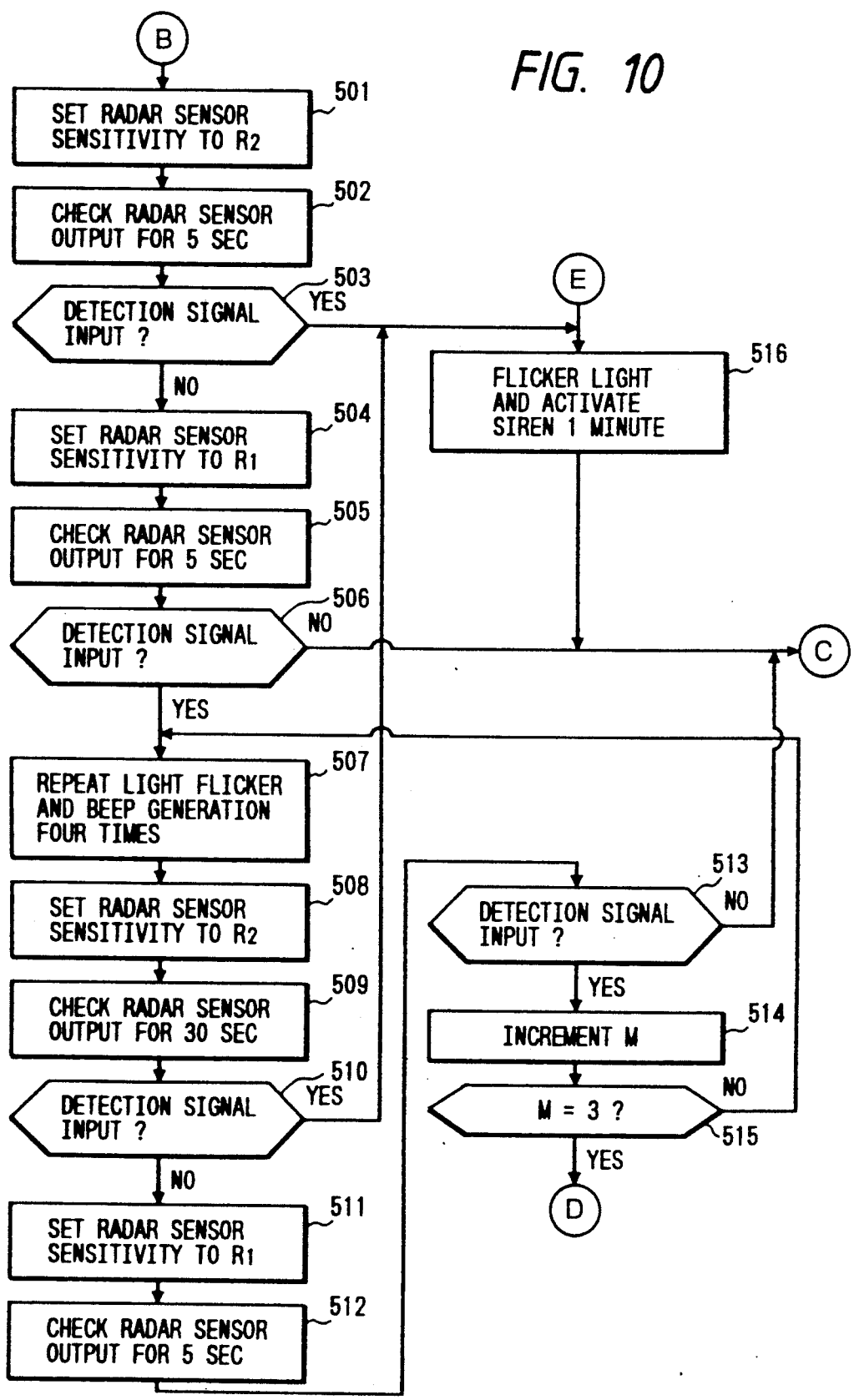
FIG. 10 is a fifth flow chart illustrating the operation of the car security system shown in FIG. 1.
Figure 11:
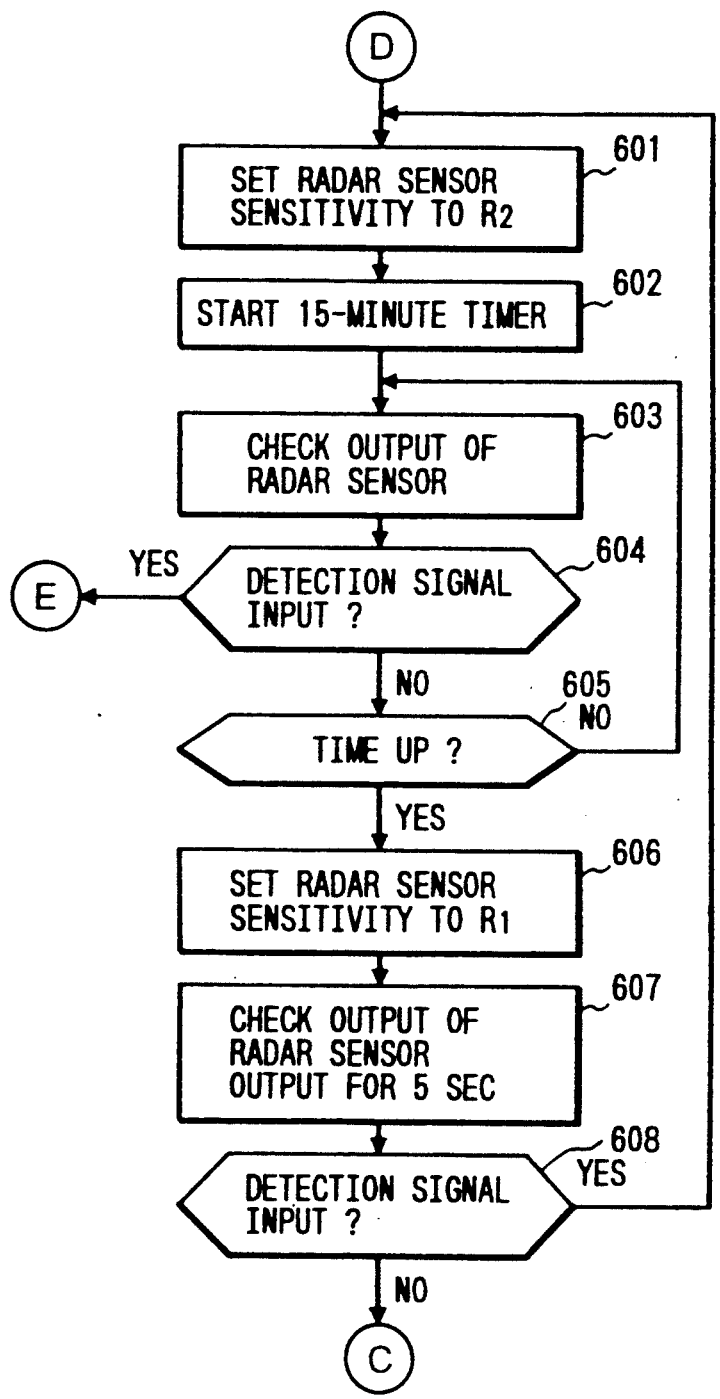
FIG. 11 is a sixth flow chart illustrating the operation of the car security system shown in FIG. 1.

An answer YES given to the question posed in Step 515 in FIG. 10 suggests that an extraordinary state is periodically established only on the exterior of the vehicle. This means that it is raining. In this case, the operation performed by the main part 2 of the car security system is shifted to the flow shown in FIG. 11, in which the sensitivity control section 2c changes the sensitivity of the radar sensor 1 to $R_2$, thereby reducing the monitoring area to $A_2$ which covers only the interior of the vehicle. In this state, monitoring is conducted for 15 minutes (Steps 601 to 605). Since rain does not fall inside the vehicle, monitoring can be conducted without fail as the monitoring area is set to $A_2$ which covers only the interior of the vehicle. Production of a detection signal Q is determined to be an indication of abnormality, so that the process shifts to Step 516 in FIG. 10 thereby surprising and expelling the person by full activation of the alarming function. In the event that no detection signal Q is received after an elapse of 15 minutes from the setting of the sensitivity $R_2$ in Step 601, the sensitivity control section 2c temporarily resets the sensitivity to $R_1$ (Step 606) and conducts a 5-second check of the radar sensor output (Step 607). If the detection signal Q is received (YES in Step 608) during checking, the system determines that it is still raining and returns the process to Step 601 so as to continue monitoring only of the interior of the vehicle. However, if no detection signal Q is received, the system determines that it is not raining anymore, and returns the process to Step 414 of FIG. 9 so as to expand the monitoring area to $A_1$ to cover also the exterior of the vehicle.

The driver returning to the vehicle presses the disarm button 7b of the handset 7, so that a remote control signal is transmitted from the handset 7 and is received by the remote-control signal receiving section 2b of the main part 2 of the car security system. Consequently, the main part 2 of the car security systems terminates the armed mode, and the door locking control section 2e the unlocking control operation on the door locking device 6, thus unlocking the door (Steps 201, 202, 212 to 214 of FIG. 7). At the same time, the monitoring/alarming control section 2d terminates the alarming operation if the alarming operation has been continued (Steps 215,216).

In the embodiment described above before, a preliminary cautionary alarming operation is conducted when the detection signal Q is received during monitoring of the first monitoring area $A_1$ which covers also the exterior of the vehicle, and the full alarming operation is performed when the radar sensor has produced a detection signal during monitoring of the monitoring area $A_2$ which covers only the interior of the vehicle. This arrangement, however, is only illustrative and the stepping to the second monitoring area $A_2$ may be omitted. In such a case, the security system may perform the full alarming operation without conducting any cautionary alarming operation, when the radar sensor has produced a detection signal Q during monitoring of the first monitoring area $A_1$.

It is also possible to arrange such that a change-over is possible through the transmitting handset 7 between a mode which monitors both the interior and exterior of the vehicle and a mode which monitors only the interior of the vehicle.

Although the sensitivity level of the radar sensor is changed over 10 stages in the illustrated embodiment, the number of stages of the sensitivity levels may be varied. For example, the sensitivity may be varied over 5 stages or 15 stages or may be changed linearly. The variation of the sensitivity level of the radar sensor is conducted by the electromagnetic wave radiating portion. This, however, is only illustrative and the variation of the sensitivity may be effected by varying the first or second reference levels which are generated by the reference level generating portions.

As will be understood from the foregoing description, according to the present invention, the sensitivity control means progressively varies the sensitivity level of the proximity sensor at the beginning of the armed mode operation, so as to set the sensitivity to a level which is the highest within a range that does not cause the sensor to produce a detection signal. When a detection signal is produced by the proximity sensor in this state, the security system determines that an abnormal state has occurred and performs a predetermined alarming operation. If there is any moving object such as moving twigs of a tree beside the vehicle, therefore, it is possible to set the monitoring area to cover an area spreading outside the vehicle and excluding the tree, thus avoiding any erroneous operation which may otherwise be caused by the motion of the twigs.

According to the second aspect of the invention, the sensitivity control means operates, at the start of arming, so as to perform a sensitivity control on the radar sensor to set the sensitivity of the radar sensor to a first sensitivity level which is the maximum sensitivity level within the range which does not cause the radar sensor to produce the detection signal, thereby setting the monitoring coverage to a first monitoring area which covers both the interior and exterior of the vehicle and, when the radar sensor has produced the detection signal during monitoring at the first sensitivity level, performs a sensitive control operation on the radar sensor to set the sensitivity of the radar sensor to a second sensitivity level, thereby setting the monitoring coverage to a second monitoring area which covers only the interior of the vehicle. In addition, the monitoring/alarming control means, upon receipt of the detection signal from the radar sensor which has been set to the first sensitivity level by the sensitivity control means, determines that an abnormal state has occurred and executes a first alarming control so as to enable the alarming means to perform the preliminary cautionary alarming operation and, upon receipt of the detection signal from the radar sensor which has been set to the second sensitivity level by the sensitivity control means, determines that an abnormal state has occurred and executes a second alarming control to enable the alarming means to perform the full alarming operation.

It is therefore possible to set the monitoring area to cover an area spreading outside the vehicle and excluding the tree, thus avoiding any erroneous operation which may otherwise be caused by the motion of the twigs. In addition, a preliminary cautionary alarming operation is performed when the vehicle is approached by a suspicious person so that incidents such as theft are avoided. In addition, when a person has broken into the vehicle, the full alarming operation is put into effect to cause the person to run away.

Although the invention has been described through its specific forms, it is to be understood that the described embodiments are only illustrative and various changes and modifications may be imparted thereto without departing from the scope of the invention which is limited solely by the appended claims.

What is claimed is:

1. A vehicle security system, comprising:
a proximity sensor having variable sensitivity to cover a corresponding monitored area and producing a detection signal upon detecting motion in the monitored area;
a sensitivity control circuit for varying the sensitivity of said proximity sensor;
a monitoring and alarming control circuit for monitoring and alarming control in response to an output from said proximity sensor;
an alarm device for performing one of a plurality of alarming operations under control of said monitoring and alarming control circuit;
said proximity sensor, said sensitivity control circuit, said monitoring and alarming control circuit and said alarm device being adapted for mounting on a vehicle;
wherein said sensitivity control circuit, upon operation of the system, automatically varies the sensitivity of said proximity sensor to set the sensitivity to a level under which level an environment of a monitored area corresponding to said set sensitivity level does not cause said proximity sensor to produce said detection signal; and wherein said monitoring and alarming control circuit determines that an abnormal state has occurred and performs an alarming control operation to cause the alarm device to perform a predetermined alarming operation, upon a receipt of said detection signal from said proximity sensor after the setting of the sensitivity level;

and wherein said sensitivity control circuit finds a maximum sensitivity level corresponding to a maximum monitored area an environment of which does not cause said proximity sensor to produce said detection signal, and sets the sensitivity of said proximity sensor to the maximum sensitivity level.

2. A system according to claim 1, wherein said sensitivity control circuit starts operation to vary the sensitivity in response to an arming operation start signal.

3. A system according to claim 1, wherein said proximity sensor is a radar sensor.

4. A system according to claim 1, wherein said sensitivity control circuit repeats the finding of said maximum sensitivity.

5. A vehicle security system, comprising:
a proximity sensor having variable sensitivity and producing a detection signal upon detecting motion in a monitored area;
a sensitivity control circuit for varying the sensitivity of said proximity sensor;
a monitoring and alarming control circuit for monitoring and alarming control in response to an output from said proximity sensor;
an alarm device for performing one of a plurality of alarming operations under control of said monitoring and alarming control circuit;
said proximity sensor, said sensitivity control circuit, said monitoring and alarming control circuit and said alarm device being adapted for mounting on a vehicle;
wherein said sensitivity control varies the sensitivity of said proximity sensor to a first sensitivity level, thereby setting monitoring coverage of a first monitored area and, when said proximity sensor has produced said detection signal during monitoring at said first sensitivity level, controls said proximity sensor to set the sensitivity of said proximity sensor to a second sensitivity level, thereby setting the monitored coverage of a second monitored area; and
wherein said monitoring and alarming control circuit determines that an abnormal state has occurred and performs an alarming control operation to cause the alarm device to perform a predetermined alarming operation when said detection signal is received from said proximity sensor during the monitored at said second sensitivity level.

6. A system according to claim 5, wherein said alarm device performs a preliminary cautionary alarming operation or a full alarming operation under the control of said monitoring and alarming control circuit; and
wherein said monitoring and alarming control circuit, upon receipt of said detection signal from said proximity sensor which has been set to said first sensitivity level, determines that an abnormal state has occurred and executes a first alarming control to enable said alarm device to perform said preliminary cautionary alarming operation and, upon receipt of said detection signal from said proximity sensor which has been set to said second sensitivity level by said sensitivity control circuit, determines that an abnormal state has occurred and executes a second alarming control to enable said alarm device to perform said full alarming operation.

7. A system according to claim 5, wherein said sensitivity control starts operation to vary the sensitivity in response to an arming operation start signal.

8. A system according to claim 5, wherein said sensitivity control circuit controls said proximity sensor to find said first sensitivity level which is the maximum sensitivity level corresponding to a maximum monitored area an environment of which does not cause said proximity sensor to produce said detection signal, and sets the sensitivity of said proximity sensor to said first sensitivity level.

9. A car security system according to claim 8, wherein said sensitivity control circuit repeats finding said first sensitivity level.

10. A system according to claim 5, wherein said second sensitivity level is controllable by a transmitting handset when the system is set in a test mode.

11. A system according to claim 5, wherein said first monitored area includes both an interior and an exterior of said vehicle, while said second monitored area includes only the interior of said vehicle.

12. A system according to claim 5, wherein, when no detection signal is received in a first predetermined period from said proximity sensor which has been set to said second sensitivity level, said sensitivity control circuit resets the sensitivity of said proximity sensor to said first sensitivity level.

13. A system according to claim 12, wherein said first monitored area includes both an interior and an exterior of said vehicle, while said second monitored area includes only the interior of said vehicle, and wherein said sensitivity control circuit maintains said second sensitivity level at least for a second predetermined period of time after reception of said detection signal from said proximity sensor at said first sensitivity level and lack of detection signal from said proximity sensor at said second sensitivity level occur.

14. A vehicle security system, comprising:
a radar sensor having variable sensitivity and producing a detection signal upon detecting motion in a monitored area;
a sensitivity control circuit for controlling the sensitivity of said radar sensor;
a monitoring and alarming control circuit for monitoring and alarming control in response to an output from said radar sensor;
an alarm device for performing one of a preliminary cautionary alarming operation and a full alarming operation under the control of said monitoring and alarming control circuit;
said radar sensor, said sensitivity control circuit, said monitoring and alarming control circuit and said alarm device being adapted for mounting on a vehicle;
wherein said sensitivity control circuit, at the start of arming, controls the sensitivity of said radar sensor to a first sensitivity level which is the maximum sensitivity level corresponding to a maximum monitored area an environment of which does not cause said radar sensor to produce said detection signal, thereby setting the area monitored to a first monitoring area which includes both an interior and an exterior of said vehicle and, when said radar sensor has produced said detection signal during monitoring at said first sensitivity level, controls the sensitivity of said radar sensor to a second sensitivity level, thereby setting the area monitored to a second monitoring area which only includes the interior of said vehicle; and wherein said monitoring and alarming control circuit upon receipt of said detection signal from said radar sensor which has been set to said sensitivity level, determines that an abnormal state has occurred and executes a first alarming control to enable said alarm device to perform said preliminary cautionary alarming operation and, upon receipt of said detection signal from said radar sensor which has been set to said second sensitivity level, determines that an abnormal state has occurred and executes a second alarming control to enable said alarm to perform said full alarming operation.

15. A system according to claim 14, wherein said preliminary cautionary alarming operation includes headlight flashing and buzzer beeping, and said full alarming operation includes headlight flashing and generation of sound by a siren.

16. A system according to claim 14, wherein said second sensitivity level is controllable by a transmitting handset when the system is set in a test mode.

17. A system according to claim 14, wherein, when no detection signal is received in a predetermined period from said radar sensor which has been set to said second sensitivity level, said sensitivity control circuit resets the sensitivity of said radar sensor to said first sensitivity level.

* * * * *